H. CRAMER.
VEHICLE WHEEL.
APPLICATION FILED JAN. 19, 1905. RENEWED NOV. 26, 1907.
900,264.
Patented Oct. 6, 1908.
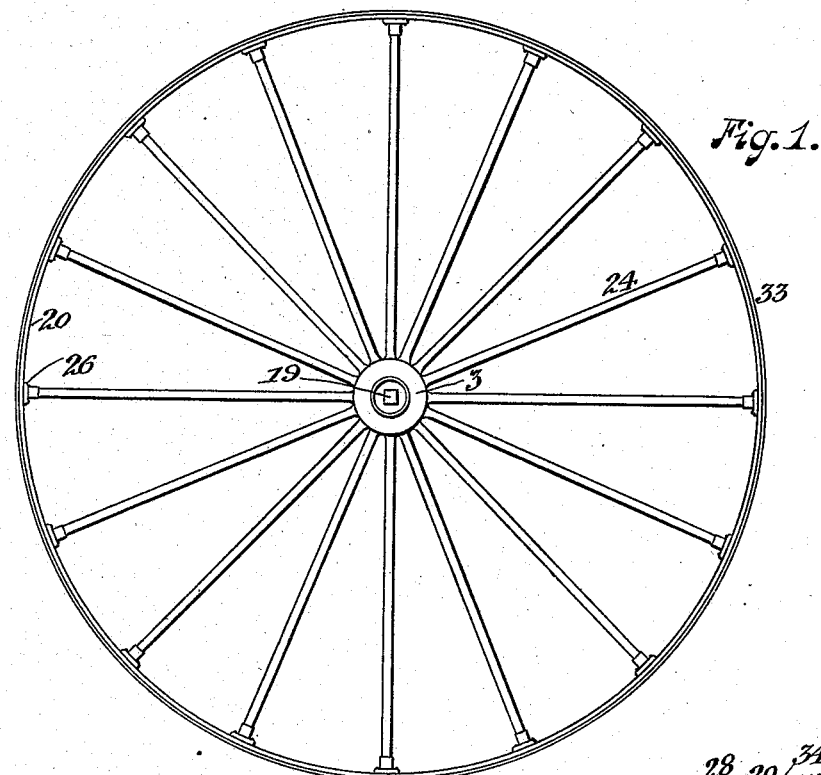
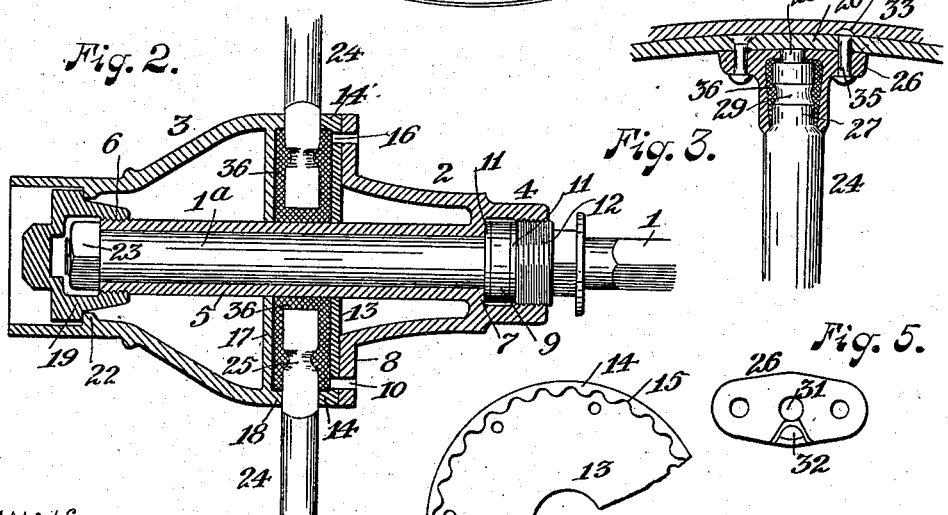
Witnesses:
M. R. Seely
Celeste Ansell
Inventor:
Herman Cramer
by Spear & Seely,
Attorneys.

UNITED STATES PATENT OFFICE.

HERMAN CRAMER, OF SONORA, CALIFORNIA.

VEHICLE-WHEEL.

No. 900,264.　　　　Specification of Letters Patent.　　　　Patented Oct. 6, 1908.

Application filed January 19, 1905, Serial No. 241,807. Renewed November 26, 1907. Serial No. 403,905.

*To all whom it may concern:*

Be it known that I, HERMAN CRAMER, citizen of the United States, residing at Sonora, in the county of Tuolumne and State of California, have invented certain new and useful Improvements in Vehicle-Wheels, of which the following is a specification.

My invention relates to wheels for vehicles and my object is to produce a wheel which when completed shall be practically integral, by which I mean that it shall be as firm and rigid as if formed in a single piece. I can secure this result even when employing wooden spokes, which, indeed I prefer to use; and such a wheel when properly made and set up true, will remain true for an indefinite period of time. This is because a wheel made according to my invention is not subject to the various causes of deterioration which shorten the lives of wheels as ordinarily constructed; such as the warping and loosening effect of changes of temperature, dry and wet weather, etc. These loosening effects are well known and ordinarily apply to the whole wheel, from the connection of the spokes to the hub, through the attachment of the spokes to the felly, to the union of the tire to the latter; and hence my invention by keeping all these connections firm and rigid pertains to the entire construction of the wheel, and its advantages apply to every part of the same.

An embodiment of my invention is shown in the accompanying drawing, in which:—

Figure 1 is an elevation of a wheel constructed according to my invention: Fig. 2 is a longitudinal section of a hub: Fig. 3 is a section at the joint between a spoke and the felly: Fig. 4 is a broken elevation of one of the separate clamping disks for securing the spokes in the hub: Fig. 5 is a plan view of the hollow lug for connecting a spoke to the felly.

The axle 1 may be of any desired cross section as square, for the greater portion of its length, but near its ends for the extent of the hubs and to form bearings for them, it is turned round as shown at 1ª. The hub is composed of two boxes, 2 and 3. The inner box 2 is a single casting having at its inner end an internally threaded socket 4. It is also formed with a long sleeve 5 forming a plain parallel bearing for the round portion of the axle and this sleeve, at its outer end, is externally threaded as shown at 6. A shoulder 7 is formed between the socket 4 and sleeve 5, which shoulder is the bottom of the socket. The box 2 has a flange 8 which is of the full diameter of the hub, and which has perforations 10 preferably corresponding to the destined number of spokes. Fixed upon the axle in any desired way so as to become a part of said axle, is a collar 9 having the two packing disks 11, 11 which when the parts are assembled is forced against the shoulder 7 by a nut 12, which engages the internal thread of said socket.

Adjacent to the outer face of the flange 8 is a disk 13 having a central opening for the sleeve 5 and an outwardly projecting flange 14, the inner periphery of which flange is waved, recessed or otherwise indented as shown at 15 in Fig. 4. This disk is provided with perforations 16, which are adapted to register with the perforations 10 of the flange 8. The disk is riveted to the said flange and so forms a part of the box 2.

The outer box 3 is also a single hollow casting whose bottom 17 has a central opening for the passage of the sleeve 5. It has an inwardly extending flange 18 opposite the flange 14 of disk 13. This box tapers or curves outwardly, and its outward open end is adapted to receive a nut 19 which engages with the thread 6 on the sleeve 5, and is screwed up until its head bears against a shoulder 22 on the box 3. The axle at its extreme end can be reduced and threaded as shown in Fig. 2 and provided with a nut 23 and I prefer to use such a nut especially with automobile axles, in which case the inner nut 12 would be dispensed with.

The spokes 24 are clamped between the flanges 14 and 18 and their inner ends, preferably provided with grooves 25, project into the circular space bounded by the said flanges, the box 3, the disk 13 and the sleeve 5.

The connection between the spokes and the rim of the wheel is illustrated in Figs. 3 and 5. The felly 20 is a single strip of metal curved to a circle and welded or otherwise secured at its ends. At proper intervals in its circumference are riveted lugs 26 each having an inwardly tapered socket for receiving a spoke. The end of each spoke is reduced as shown at 27, and 28, and the reduced portion 27 is grooved as shown at 29. The extreme end 28 enters a hole 31 in the lug 26 and abuts against the felly. The edge of the lug 26 has a hole 32 which extends below the plane of the felly and communicates with the socket. The tire 33 is adapted to be shrunk upon the rim. It is provided at intervals with depressions 34 each of which receives the head of at least one of the rivets which secure the lugs 26 to the felly. Such a rivet is shown at 35 in Fig. 3, which was passed through the felly and lug and headed in the lug before the tire was set in place.

In assembling the parts, it is preferred to set the spokes first in the rim and then in the hub and secure them by the clamping means shown. When by the use of suitable gages or any proper apparatus for determining that the spokes are in proper radial position and that the rim is true or in the exact vertical plane of rotation, the end nut is turned up drawing the two boxes together and firmly clamping the spokes. I now have spokes secured at both rim and hub in spaces or sockets with which communicate openings or passages accessible from outside. Through these openings, I pour melted material 36, preferably an alloy such as type metal or babbitt which fills the sockets or spaces, surrounds the ends of the spokes, and closes the openings through which it has been poured. As the exact true relative positions of the parts have been ascertained and determined, this embedding of the spoke-ends in metal absolutely fixes and maintains such correct positions, and in fact makes a solid integral wheel, which is practically indestructible under ordinary conditions of use, and which will remain indefinitely in its original proper condition. The mass of metal in the hub space is anchored securely by entering the indented flange of the disk 13; and such metal at the rim is also anchored and secures the spokes on account of the inward taper of the socket which receives such metal.

I do not limit myself to the exact construction and arrangement herein described and shown in the drawing, as I desire to avail myself of such modifications and equivalents as fall properly within the spirit of my invention.

Having thus fully described my invention, what I claim as new and desire to secure by Letters Patent, is:—

1. In a vehicle wheel, a hub comprising two separate hollow boxes, one of which is provided with a sleeve forming the axle bearing, said boxes being spaced apart to receive the spokes between them, a mass of hardened molten metal in the space between the boxes, and a nut engaging with said sleeve and bearing against the other box, whereby the said boxes are clamped on the spokes.

2. In a vehicle wheel, a hub comprising two separate hollow boxes, one of which is provided with a sleeve forming the axle bearing, said boxes being spaced apart to receive the spokes between them, and a nut engaging with said sleeve and bearing against the other box, whereby the said boxes are clamped on the spokes, and hardened molten metal between said boxes in which the spokes are embedded.

3. In a vehicle wheel, a hub comprising two separate boxes spaced apart so that the spokes can be admitted between them, an intermediate disk secured to one of the said boxes and having a flange approaching a corresponding flange on the other box, means for drawing said boxes together so as to secure the spokes between them, a mass of hardened metal in which the spokes are embedded, and registering holes in said disk and in the box to which it is secured, whereby such molten metal can be introduced so as to surround the said spokes.

4. In a vehicle wheel, the combination of an axle having a fixed collar and a box having a shoulder adapted to bear against said collar and provided with a socket surrounding said collar, a nut on the axle threaded into said socket, a second box, adapted in coöperation with the first box to receive the spokes, a mass of hardened metal between the boxes, and a nut bearing on said second box and engaging said first box whereby the parts are drawn together and clamped upon the spokes.

5. In a vehicle wheel, a hub comprising two separate boxes an intermediate disk secured to one of them, spokes inserted between said disk and the other box, a flange on said disk having an indented edge, and a mass of hardened molten metal in the space between said disk and the other box; whereby said molten metal surrounds the spokes and also enters said indented edge and anchors said disk.

6. In a vehicle wheel, the combination with a hub and a spoke of a felly having a lug provided with a socket and with a transverse hole connecting said socket with the outside, the said lug being riveted to the felly, and the said socket being provided with a mass of molten metal introduced through said hole and surrounding the end of the spoke.

7. In a vehicle wheel, the combination with a hub and spokes of a felly having spoke-lugs secured to its inner surface, the tire adapted to be shrunk upon the felly and having a series of depressions and a rivet passing through said lug and the felly and entering the depressions in said tire.

In testimony whereof I have affixed my signature, in presence of two witnesses, this first day of November 1904.

HERMAN CRAMER.

Witnesses:
J. H. MILLER,
L. W. SEELY.